United States Patent [19]

Furuta

[11] 4,344,095
[45] Aug. 10, 1982

[54] RECORDED-SIGNAL POSITION DETECTING CIRCUIT

[75] Inventor: Kenzi Furuta, Hachioji, Japan

[73] Assignee: Olympus Optical Co., Ltd., Tokyo, Japan

[21] Appl. No.: 134,122

[22] Filed: Mar. 26, 1980

[30] Foreign Application Priority Data

Apr. 10, 1979 [JP] Japan .............................. 54-47067[U]

[51] Int. Cl.³ ...................... G11B 15/52; G11B 27/28
[52] U.S. Cl. ..................................... 360/73; 360/72.2; 360/74.4
[58] Field of Search ...................... 360/73, 74.4, 72.1, 360/71, 72.2

[56] References Cited

U.S. PATENT DOCUMENTS

| | | | |
|---|---|---|---|
| 2,977,422 | 3/1961 | Pear, Jr. | 360/73 |
| 3,717,856 | 2/1973 | Kubo et al. | 360/73 |
| 3,846,831 | 11/1974 | Johnson, Jr. | 360/84 |
| 3,851,116 | 11/1974 | Cannon | 360/73 |
| 4,000,518 | 12/1976 | Stearns | 360/74.4 |
| 4,193,100 | 3/1980 | Bagley et al. | 360/73 |
| 4,237,498 | 12/1980 | Van Eijck et al. | 360/74.4 |

FOREIGN PATENT DOCUMENTS

| | | | |
|---|---|---|---|
| 48-87805 | 11/1973 | Japan . | |
| 52-12818 | 1/1977 | Japan | 360/74.4 |
| 54-6417 | 1/1979 | Japan | 360/73 |

*Primary Examiner*—Alfred H. Eddleman
*Attorney, Agent, or Firm*—Frishauf, Holtz, Goodman & Woodward

[57] ABSTRACT

There is provided a recorded-signal position detecting circuit which records a detection signal, whose frequency is much lower than that of an aural signal, in a tape during the recording mode in a manner to mix it upon the aural signal and reproduces the detection signal via a filter permitting the passage therethrough of this signal only, thereby to detect the position of the recorded detection signal. In this circuit, when the speed of the tape during the recording mode varies, the frequency of the detection signal varies with a change in such tape speed.

5 Claims, 1 Drawing Figure

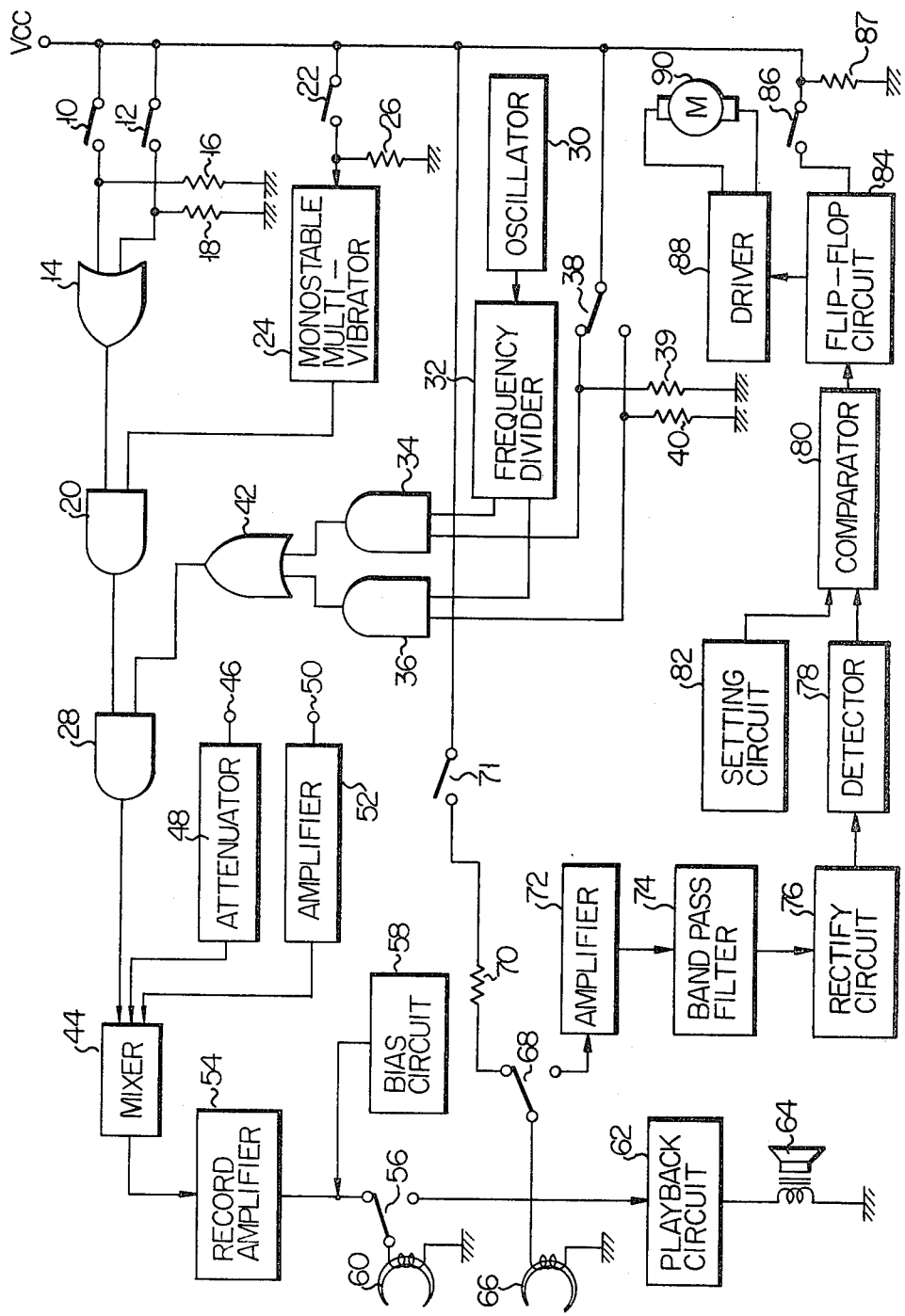

RECORDED-SIGNAL POSITION DETECTING CIRCUIT

BACKGROUND OF THE INVENTION

This invention relates to a circuit for detecting the position of a signal recorded on a magnetic tape.

A conventional tape recorder is provided with a mechanical counter for detecting the rotation of a take-up shaft, the counter being used to obtain the recorded position of an aural signal. In this type of mechanical counter, however, unless one notes a predetermined counted value in advance, it is impossible to cause the tape to travel with high speed up to its corresponding recording position and to stop at this position. This is troublesome and is also insufficient in the sense that the tape travel should be stopped precisely at the predetermined recording position. Further, one cannot have knowledge concerning the tape length (the amount of signals recorded) from such counted value. This makes such a mechanical counter inconvenient, in the case of, for example, a dictating tape recorder, i.e. a so-called transcriber, to detect the recorded position of a signal in the tape. Recently, therefore, in order to solve such problems, at the time of recording for example a voice, a detection signal having a lower frequency than the aural signal is simultaneously recorded on the tape for a specified period of time and, at the cuing or reviewing mode during the fast forwarding operation or rewinding operation with the magnetic head in contact with the tape the detection signal is reproduced to detect the recorded position of such voice. The travel speed of the tape in such cuing or reviewing mode (hereinafter, referred to as "the detection mode") becomes several tens of times as high as that in the recording or playing-back mode. For this reason, the detection signal, in the playing-back mode when the tape is subjected to low-speed travel, is not reproduced since its frequency band is too low, but, in the detection mode the frequency of such detection signal increases up to a several tens of times higher frequency in accordance with an increase in the travel speed of the tape, so that such detection signal becomes reproducible. Since at this time the frequency of the aural signal becomes high so that the aural signal departs from the frequency band over which signal reproduction by the reproducing circuit is possible, it is impossible that such aural signal is reproduced. By counting the number of detection signals as above reproduced it thus becomes possible under the detection mode to stop the travel of the magnetic tape at a predetermined position. Simultaneously it also becomes possible, by such counting operation, to know the amount of recorded signals between the detection signals.

The speed of the tape at the recording and playing-back mode, however, in consideration of the amount of tape consumption and the aural amount of signals reproduced, is rather preferred to be changeable-over to two different speeds or so than kept constant. Usually, the tape speed in the detecting mode is set at the highest possible speed. Upon variation in the tape speed in the recording mode, therefore, the tape speed in the detection mode as taken relative to the former speed, that is, the magnification of increase in the frequency of the detection signal, varies. Thus, it is necessary to widen the frequency band of the reproducing circuit, to an appreciably large extent. This results not only in a complicated structure of the circuit involved but also in a decrease in the reproducing precision of the detection signal due to the mixing of noise which is attributable to such wide frequency band.

SUMMARY OF THE INVENTION

The object of the invention is to provide a recorded-signal position detecting circuit which is used with a magnetic tape recording and reproducing device capable of changing over its tape speed in its recording and playing-back modes and in the detecting mode of which the position of recorded signals can be detected by a simple circuit construction.

The above object has been achieved by a circuit for detecting the position of a signal recorded on a magnetic tape which is used with a magnetic tape recording and reproducing device having a recording mode changeable in the tape speed, a reproducing mode arranged to have the same tape speed as that of the recording mode and a detecting mode arranged to have a magnetic head allowed to contact with a magnetic tape with it traveling at a speed higher than the tape speed under the recording mode, and which comprises a signal generating means for generating a plurality of frequency signals whose frequency are lower than the frequency of an aural signal, a recording means for recording in a predetermined position of a magnetic tape an output signal from the signal generating means under the recording mode whose frequency corresponds to the speed of the magnetic tape, a reproducing means for reproducing an output signal of the signal generating means under the detecting mode which has been recorded on the magnetic tape, and a detecting means for detecting the number of signals reproduced by the reproducing means and producing a coincidence signal when the number has a coincidence with a predetermined number of signals to be set under the detecting mode.

BRIEF DESCRIPTION OF THE DRAWING

The drawing is a circuit diagram showing the electrical construction of a recorded-signal position detecting circuit according to an embodiment of the invention.

DETAILED DESCRIPTION OF THE PREFERRED EMBODIMENT

In the drawing, a power source terminal Vcc is connected to input terminals of an OR gate 14 via a recording switch 10 and via a playing-back switch 12. The input terminals of the OR gate 14 are grounded via resistors 16 and 18, respectively. An output terminal of the OR gate 14 is connected to one input terminal of an AND gate 20. The recording switch 10 and playing-back switch 12 are respectively closed in interlocking relationship with the actuation of operating buttons (not shown) provided on an operating board of the tape recorder, and, once closed, is kept closed until a stop button is depressed. The power source terminal Vcc is connected to a monostable multivibrator 24 via a position detecting switch 22. An input terminal of the monostable multivibrator 24 is grounded via a resistor 26. The position detecting switch 22 is made restorable to its original state and is kept closed during only a period in which a position detecting button (not shown) is depressed. An output terminal of the monostable multivibrator 24 is connected to the other input terminal of the AND gate 20. An output terminal of the AND gate 20 is connected to one input terminal of the AND gate 28. An output terminal of an oscillator 30 is connected to an input terminal of a frequency divider 32. The frequency divider 32 has two output terminals, at a first one of which a pulse signal of 20 Hz is supplied and at a second one of which a pulse signal of 40 Hz is supplied. The first and second output terminals of the frequency divider 32 are connected to terminals each at one side of AND gates 34 and 36, respectively. The power source terminal Vcc is connected to a fixed contact of a tape speed change-over switch 38, a first movable contact of which is connected to the other input-terminal of the AND gate 34 and a second movable contact of which is connected to the other input terminal of the AND gate 36. The tape speed change-over switch 38 is changed over depending upon the tape speed of the recording and playing back mode of the tape recorder. For instance, when the tape speed is 1.2 cm/sec., the switch 38 is turned to the first movable contact side. When the tape speed is 2.4 cm/sec., the switch is turned to the second movable contact side. Further, the first and second movable contacts of the switch 38 are grounded via resistors 39 and 40, respectively. The outputs of the AND gates 34 and 36 are connected to the other input terminal of the AND gate 28 via an OR gate 42. An output terminal of the AND gate 28 is connected to a first input terminal of a mixer 44. The terminal 46 of a line connected to a tuner or pre-amplifier is connected to a second input terminal of the mixer 44 via an attenuator 48. The terminal 50 of a microphone is connected to a third input terminal of the mixer 44 via an amplifier 52. The mixer 44 mixes the input signals. The output signal of the mixer 44 is supplied to a first movable contact of a switch 56 via a record amplifier 54. The output signal of a bias circuit 58 is also supplied to the first movable contact of the switch 56. A fixed contact of the switch 56 is connected to a first magnetic head 60. A second movable contact of the switch 56 is connected to a playback circuit 62. The first magnetic head 60 is a so-called recording head which, at the time of the recording and reproducing operations, is so pushed out as to contact with a magnetic tape in interlocking relationship with the depression of the relevant operating buttons. The playback circuit 62 includes a playback amplifier, a frequency compensation circuit, etc. An output signal from the playback circuit 62 is supplied to a speaker 64. The switch 56, responsive to the recording switch 10 and the reproducing switch 12, is turned, at the time of the recording operation, to its first movable contact side and turned, at the time of the reproducing operation, to its second movable contact side.

A second magnetic head 66 is connected to a fixed contact of a switch 68. A first movable contact of the switch 68 is connected to the power source terminal Vcc via a resistor 70 and then via a switch 71. A second movable contact is connected to a rectifying circuit 76 via an amplifier 72 and then via a bandpass filter 74. The second magnetic head is caused to contact with a magnetic tape at the times of recording, cuing and reviewing operations. The switch 68 is turned, at the time of the recording operation, to its first movable contact side, and turned, at the times of the cuing and reviewing operations, to its second movable contact side. Since the switch 71 is closed in interlocking relationship with the actuation of a recording button, a second magnetic head 66 functions, in the recording operation mode, as an erasing head and functions, in the cuing and reviewing operation modes, as a reproducing head.

The pass band of the bandpass filter 74 is set to a frequency band of 600 to 1,200 Hz when the tape speed under the cuing and reviewing operation modes is set at approximately 36 to 72 cm/sec. An output signal from the rectifying circuit 76 is supplied to a detector 78 to detect the number of the signals. The number of the input signals thus detected is supplied to one input terminal of a comparator 80. To the other input terminal of the comparator 80 is connected an output terminal of a setting circuit 82 arranged to generate a signal having a specified level. The comparator 80, upon coincidence of the number of signals supplied at its one input terminal with that supplied at its other input terminal, produces a coincidence pulse. An output terminal of the comparator 80 is connected to a set terminal of a flip-flop circuit 84, a reset terminal of which is connected to the power source terminal Vcc via a switch 86 and an output terminal of which is connected to a driver 88. One end of the switch 86 is grounded via a resistor 87 and the switch 86 is closed in interlocking relationship with the actuation of the stop button. An output from the driver 88 is supplied to a motor 90.

The operation of the recorded-signal position detecting circuit which has the foregoing construction will now be explained.

When the recording button is depressed, the recording switch 10 is closed. In interlocking relationship with this closure, the switch 56 is turned to its first movable contact side. Thus, a sound signal which is supplied from the tuner or pre-amplifier via the line terminal 46, or which is supplied from the microphone via its terminal 50, is biased and is recorded on the magnetic tape. Before recording of predetermined sound signals, the switch 22 is temporarily closed. When the switch 22 is closed, a high level signal is supplied to energize the monostable multivibrator 24, so that the output signal thereof has a high level for a specified period of time. Since the recording switch 10 is closed as mentioned above, the output signal of the OR gate 14 also has a high level and therefore the AND gate 20 is rendered conductive for a specified period of time. On the other hand, the oscillation signal from the oscillator 30 is frequency-divided by the frequency divider 32 into two types of signals. Since either one of the AND gates 34 and 36 is rendered conductive in accordance with the change-over of the tape speed change-over switch 38, the frequency-divided signal corresponding to the tape speed is supplied to the one input terminal of the AND gate 28 via the AND gate 34 or 36 and via the OR gate 42. When the tape speed is 1.2 cm/sec., a signal of 20 Hz is supplied to the AND gate 28. When the tape speed is 2.4 cm/sec., a signal of 40 Hz is supplied to the AND gate 28. The output of the AND gate 20 which is supplied to the other input terminal of the AND gate 28 has, as stated above, a high level for the specified period of time and therefore the AND gate 28 supplies for that specified period of time the frequency-divided signal to the mixer 44 in the form of a detection signal. Thus, when the switch 22 is closed during the recording operation mode, the detection signal having a frequency corresponding to the tape speed is recorded on the same track of the magnetic tape as the track on which the sound signal is recorded.

When, at the time of playing-back the magnetic tape having information signals recorded in the above-mentioned way, a desired portion to be played back of the tape is located in the mid course of the magnetic tape, the recorded-signal position detecting circuit is set to its detecting operation mode. At this time, the first magnetic head 60 is disengaged from the traveling surface of the tape and the second magnetic head 66 is instead brought into contact with the traveling surface of the tape. Since the tape speed in the cuing and reviewing modes varies with the radius of the tape wound on the shaft, it becomes 36 to 72 cm/sec. Since the switch 68 is turned to the second movable contact side, the information signals recorded on the magnetic tape via the magnetic head 66 are amplified by the amplifier 72 and are supplied to the rectifying circuit 76 via the bandpass filter 74. In this connection, the frequency of the detection signal of 20 Hz as recorded during the recording mode at the tape speed of 1.2 cm/sec. becomes 600 to 1,200 Hz since the tape speed becomes as high as thirty to sixty times the tape speed, i.e. 36 to 72 cm/sec. The frequency of the detection signal of 40 Hz as recorded during the recording mode at the tape speed of 2.4 cm/sec. becomes 600 to 1,200 Hz since the tape speed becomes as high as fifteen to thirty times the tape speed. Since in this way the frequency of the detection signal varies with the tape speed during the recording mode, the frequency band of the detection signal at the time of reproduction is kept unchanged. Since the pass band of the bandpass filter 74 is set at a frequency range of 600 to 1,200 Hz and aural signals from the magnetic tape become signals of much higher frequency, such aural signals are blocked by the bandpass filter 74 with a consequence that only the detection signals are supplied to the rectifying circuit 76. Those detection signals are rectified by the rectifying circuit 76 and are supplied to the detector 78. The detector 78, each time the detection signal from the rectifying circuit 76 is supplied thereto, counts the number of the detection signals thus supplied. This counted value is then supplied to the one input terminal of the comparator 80. If the number of the detection signals corresponding to a tape position desired to be played back is set beforehand in the information signal setting circuit 82, the comparator 80 generates a coincidence pulse at the time when the tape travels up to such desired position. The flip-flop circuit 84 is set upon receipt of such coincidence pulse and supplies a stop signal to the driver 88 to cause it to stop the rotation of the motor 90. This stoppage persists until the switch 86 is closed and the flip-flop circuit 84 is reset. Therefore, even when the detection signal is recorded at a different tape speed, it can be reproduced, in the detection mode, with the frequency band kept unvaried. This embodiment is so arranged that both the aural signal and the detection signal are recorded on the same track of the tape, but may be so arranged as to permit such both signals to be recorded on different tracks of the tape. Further, if the circuit is so arranged that the detection signal is recorded immediately before and immediately after a specified signal and that the time duration between such two detection signals is counted, the time duration of recording of such specified signals can be confirmed. This is effective especially for a transcriber.

What is claimed is:

1. In a magnetic tape recording and reproducing device having a multi-speed recording mode which is settable to carry out recording at a selected one of a plurality of different tape recording speeds, a reproducing mode arranged to have the same tape speeds as that of the recording mode and a detecting mode in which a magnetic head contacts with a magnetic tape which is caused to travel at a speed higher than the tape speed in the recording mode by the rotation at a prescribed speed of a reel shaft serving to wind up the tape, said prescribed speed being higher than the rotation speed of the reel shaft in the recording mode and in the reproducing mode, an improved recorded-signal position detecting circuit comprising:

a signal generating means for generating an output cue signal having one of a plurality of frequencies, each of said output cue signal frequencies being lower than the frequency of an aural signal and in proportion to a given one of said plurality of tape recording speeds, the output cue signal generated by the generating means being in proportion to the set tape recording speed of the recording mode;

recording means coupled to the signal generating means for recording the output cue signal of said signal generating means on a magnetic tape at a predetermined position on the tape in the recording mode;

reproducing means coupled to the magnetic tape for reproducing from the magnetic tape, in the detecting mode, an output cue signal of said signal generating means which was previously recorded on said magnetic tape, the reproducing means comprising a single bandpass filter whose frequency pass band is lower than the frequency band of said aural signal, the signal reproduced from said magnetic tape being passed through said single bandpass filter for extracting from the signals on said magnetic tape the output cue signal of said signal generating means which was previously recorded in said magnetic tape; and detecting means coupled to said reproducing means for detecting, in the detecting mode, the number of signals reproduced by said reproducing means and for producing a coincidence signal when said number of reproduced signals coincides with a predetermined number of signals.

2. The recorded-signal position detecting circuit of claim 1, comprising a gate coupling the output signal of said signal generating means to said recording means; and a monostable multivibrator coupled to said gate for rendering said gate conductive for a specified period of time.

3. The recorded-signal position detecting circuit of claim 1 or 2, wherein said detecting means supplies said coincidence signal to a motor of said magnetic tape recording and reproducing device, as a drive-stop signal.

4. The recorded-signal position detecting circuit of claim 1, wherein said output cue signal frequencies are in exact correspondence to respective ones of said plurality of tape recording speeds.

5. The recorded-signal position detecting circuit of claim 1, wherein said magnetic tape recording and reproducing device has at least two recording speeds, one higher than the other, and wherein said signal generating means generates a first output cue signal having a given frequency when said magnetic tape recording and reproducing device is set at the lower of said at least two tape recording speeds, and generates a second output cue signal having a frequency higher than the frequency of said first output cue signal when said magnetic tape recording and reproducing device is set at said higher of said at least two tape recording speeds.

* * * * *